US009560192B2

(12) United States Patent
Dianda et al.

(10) Patent No.: US 9,560,192 B2
(45) Date of Patent: Jan. 31, 2017

(54) METHODS AND APPARATUS FOR PROVISIONING AND USING IP CLIENTS WHICH CAN BE ARRANGED ACCORDING TO GROUPS AND SHARE A COMMON TELEPHONE NUMBER

(71) Applicant: Time Warner Cable Enterprises LLC, New York, NY (US)

(72) Inventors: Robert Dianda, Ashburn, VA (US); Thirumal Ramachandruni, Aldie, VA (US); Mathivanan Manickam, Centerville, VA (US); Naresh Dhiman, Stone Ridge, VA (US); Selcuk Ozler, Herndon, VA (US); Peter McGrath, Ashburn, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 130 days.

(21) Appl. No.: 14/586,634

(22) Filed: Dec. 30, 2014

(65) Prior Publication Data

US 2016/0191698 A1 Jun. 30, 2016

(51) Int. Cl.
*H04L 12/66* (2006.01)
*H04M 3/02* (2006.01)
*H04L 29/08* (2006.01)
*H04M 3/42* (2006.01)

(52) U.S. Cl.
CPC ............... *H04M 3/02* (2013.01); *H04L 67/24* (2013.01); *H04M 3/42127* (2013.01)

(58) Field of Classification Search
CPC ...... H04L 67/24; H04L 65/403; H04W 76/002
See application file for complete search history.

(56) References Cited

U.S. PATENT DOCUMENTS

| 6,731,625 | B1 * | 5/2004 | Eastep | H04L 29/06 370/352 |
|---|---|---|---|---|
| 8,452,315 | B1 * | 5/2013 | Cai | H04W 76/002 455/518 |
| 2003/0185359 | A1 * | 10/2003 | Moore | G06Q 20/085 379/114.01 |
| 2005/0233776 | A1 * | 10/2005 | Allen | H04W 84/08 455/567 |

(Continued)

*Primary Examiner* — Melanie Jagannathan
(74) *Attorney, Agent, or Firm* — Michael P. Straub; Stephen T. Straub; Ronald P. Straub

(57) ABSTRACT

Methods and apparatus for allowing users in a group, e.g., family members, to share a telephone number while using different devices, e.g., IP devices, are described. The methods and apparatus allow for users in a group to obtain individual presence information for members of the group by making a single request for presence information corresponding to members of the group. In some embodiments, in response to the single request, the requesting device will be supplied with individual presence information for each member of the group to which the request corresponds. The presence information may be received in individual communications, e.g., one individual message providing presence information on a user of the group. Alternatively presence information for the individual members of the group may be included in a single message that is sent to the requesting device.

11 Claims, 9 Drawing Sheets

(56) References Cited

U.S. PATENT DOCUMENTS

| | | | | |
|---|---|---|---|---|
| 2008/0183866 A1* | 7/2008 | Maeda | ............. | H04L 67/24 709/224 |
| 2010/0285777 A1* | 11/2010 | Golobrodsky | ......... | H04L 67/24 455/412.2 |
| 2013/0018960 A1* | 1/2013 | Knysz | ............. | H04L 65/403 709/204 |
| 2013/0054684 A1* | 2/2013 | Brazier | ............. | G06Q 10/02 709/203 |

* cited by examiner

| USER ID | GROUP ID | GROUP NAME | DEVICE ID | GROUP URL | PUBLIC ID | FRIENDLY ID | FRIENDLY IMPU |
|---|---|---|---|---|---|---|---|
| 1 | 1 | SMITH | 00:19:47:FF:1D:2E | http://www.twc.com/group1 | 8071591212 | JOHN SMITH HOME | sip:<JOHN SMITH HOME>-8071591212@domain.com |
| 2 | 1 | SMITH | 00:1A:C4:42:B9:6A | http://www.twc.com/group1 | 8071591212 | JOHN SMITH MOBILE | sip:<JOHN SMITH MOBILE>-8071591212@domain.com |
| 3 | 1 | SMITH | 00:1A:C4:FE:85:6E | http://www.twc.com/group1 | 8071591212 | ANN SMITH | sip:<ANN SMITH>-8071591212@domain.com |
| 4 | 1 | SMITH | 00 1A C4 29 D6 B4 | http://www.twc.com/group1 | 8071591212 | FRED SMITH | sip:<FRED SMITH>-8071591212@domain.com |
| 5 | 1 | SMITH | 00 1B D7 B4 7D 1C | http://www.twc.com/group1 | 8071591212 | TONY SMITH | sip:<TONY SMITH>-8071591212@domain.com |
| ... | ... | ... | ... | ... | ... | ... | ... |
| 100 | 6 | JONES | 00 1C D7 B5 7D 1F | http://www.twc.com/group6 | 2222213636 | BOB JONES | sip:<BOB JONES>-8071591212@domain.com |
| 101 | 6 | JONES | 00 1C D7 B5 7D 5F | http://www.twc.com/group6 | 2222213636 | CAROL JONES | sip:<CAROL JONES>-8071591212@domain.com |
| 102 | 6 | JONES | 00 1C D7 B5 7D 9F | http://www.twc.com/group6 | 2222213636 | JIM JONES | sip:<JIM JONES>-8071591212@domain.com |

FIG. 4

| USER ID 402 | GROUP ID 404 | GROUP NAME 406 | DEVICE ID 408 | GROUP URL 410 | PUBLIC ID 412 | PRESENCE STATUS 502 | AGGREGRATED GROUP PRESENCE STATUS 504 |
|---|---|---|---|---|---|---|---|
| 1 | 1 | SMITH | 00:19:47:FF:1D:2E | http://www.twc.com/group1 | 8071591212 | NOT BUY | NOT BUSY |
| 2 | 1 | SMITH | 00:1A:C4:42:B9:6A | http://www.twc.com/group1 | 8071591212 | NOT BUSY | NOT BUSY |
| 3 | 1 | SMITH | 00:1A:C4:FE:85:6E | http://www.twc.com/group1 | 8071591212 | BUSY | NOT BUSY |
| 4 | 1 | SMITH | 00 1A C4 29 D6 B4 | http://www.twc.com/group1 | 8071591212 | NOT BUSY | NOT BUSY |
| 5 | 1 | SMITH | 00 1B D7 B4 7D 1C | http://www.twc.com/group1 | 8071591212 | NOT BUSY | ... |
| ... | ... | ... | ... | ... | ... | ... | ... |
| 100 | 6 | JONES | 00 1C D7 B5 7D 1F | http://www.twc.com/group6 | 2222213636 | NOT BUSY | NOT BUSY |
| 101 | 6 | JONES | 00 1C D7 B5 7D 5F | http://www.twc.com/group6 | 2222213636 | BUSY | NOT BUSY |
| 102 | 6 | JONES | 00 1C D7 B5 7D 9F | http://www.twc.com/group6 | 2222213636 | BUSY | NOT BUSY |

FIG. 6

METHODS AND APPARATUS FOR PROVISIONING AND USING IP CLIENTS WHICH CAN BE ARRANGED ACCORDING TO GROUPS AND SHARE A COMMON TELEPHONE NUMBER

FIELD

The present application relates to communications systems and, more particularly, to methods and apparatus where multiple devices can share a telephone number corresponding to a group of users while still being able to initiate calls between devices corresponding to members of the group that are in the same network domain.

BACKGROUND

The use of IP based communications devices for telephone and/or other communications purposes is becoming ever more common. A single user may use multiple IP devices, e.g., mobile handheld devices, home network devices, set top boxes, etc. which support voice and/or video communications and seek to use a single telephone number for the multiple devices. Another common scenario is that a family or group of individuals, e.g., corresponding to a single customer premise, may seek to share a single telephone number but use multiple different IP devices to make and/or receive calls between the devices of the group and/or devices on the public telephone network.

While a number of users corresponding to a group, e.g., household, may seek to share a common telephone number for communicating with devices on the public telephone network or outside the household, it would be desirable if they could interact with one another via their communications devices on an individual rather than group basis. For example, where family members might share a common telephone number, it is desirable that a family member be able to contact another specific family member device as desired. Similarly, while it might be desirable for a group to appear as a single entity to members outside the immediate group or network on which the family group's devices reside, it would be desirable if individual family members could easily obtain status, e.g., presence information, regarding other group/family members and their devices.

In view of the above, it should be appreciated that there is a need for methods and apparatus which would allow members of a group, e.g., family, to share a public telephone number but still communicate with one another on an individual device to individual device basis. There is also a need for methods and/or apparatus which allow for members of a group to see the individual presence status of other members of the group while also making presence information available for the group telephone number shared by the members of the group.

SUMMARY

Methods and apparatus for allowing users in a group, e.g., family members, to share a telephone number while using different devices, e.g., IP devices, are described. The IP devices operate as what are sometime referred to as soft phones. However, the IP devices maybe, and sometimes are, implemented as dedicated IP telephony devices. The methods and apparatus allow for users in a group to obtain individual presence information for members of the group by making a single request for presence information corresponding to members of the group. In response to the single request, the requesting device will be supplied with individual presence information for each member of the group to which the request corresponds. The presence information may be received in individual communications, e.g., one individual message providing presence information on a user of the group. Alternatively presence information for the individual members of the group may be included in a single message that is sent to the requesting device.

Accordingly, in at least some embodiments devices in the same network domain as the devices of the group of users may request individual presence information for members of the group through a single presence request. However, requests for presence information corresponding to the group, e.g., corresponding to the group telephone number, receive responses which provide aggregated group presence information rather than presence information corresponding to the individual members of the group. In this way, the group members can protect there privacy to outside parties and/or individuals while allowing their individual presence information to be shared with other members of the group operating on the same communications network.

To support device to device telephone calls between group members, device identifiers are included in calling party information in addition to the group telephone number. While this device identifier information is communicated as part of call establishment signals used in the same network domain as the group member devices, the unique device identifier information is striped, by a border device such as a session border controller, prior to a call initiation signal being sent outside the network domain. Thus calls to devices outside the network domain will include the group telephone number as the calling party identifier rather than the user device identifier which is used alone or in combination with the calling party telephone number as a calling party identifier for calls made between devices in the network domain.

In coming calls directed to the group telephone number will be received by a border device, e.g., session border controller, and incoming call notifications are sent to each of the user devices in the group which use the group telephone number to which the incoming call is directed.

In the above described manner, IP devices in a first network domain can be grouped, e.g., with multiple devices corresponding to a family being in a group. Group members can call one another with their individual devices being identified in call initiation signals used in the first domain. However, with respect to the outside world the group telephone number appears a corresponding to a single entity with incoming calls being answerable by any member of the group.

While in some embodiments individual presence information for members of a group is made available to devices in the first network domain in which the group member devices are located, in some embodiments the group members may restrict individual presence information being supplied to other members of the same group. In at least some such embodiments requests for group presence information are treated differently if they are from a device corresponding to a member of the group for which presence information is being requested or from a device corresponding to someone outside the group. In one such embodiment group members requesting group presence information receive individual presence information allowing, e.g., family members to see the status of the other family members, but with presence information to device which do not correspond to the group receiving aggregated presence information for the group instead.

Numerous additional features and embodiments are described in the detailed description which follows.

BRIEF DESCRIPTION OF THE FIGURES

FIG. 4 illustrates a table associating various identifiers in accordance with one embodiment of the present invention.

FIG. 6 illustrates a table associating various identifiers with presence status information in accordance with one embodiment of the present invention.

DETAILED DESCRIPTION

Figure 1:
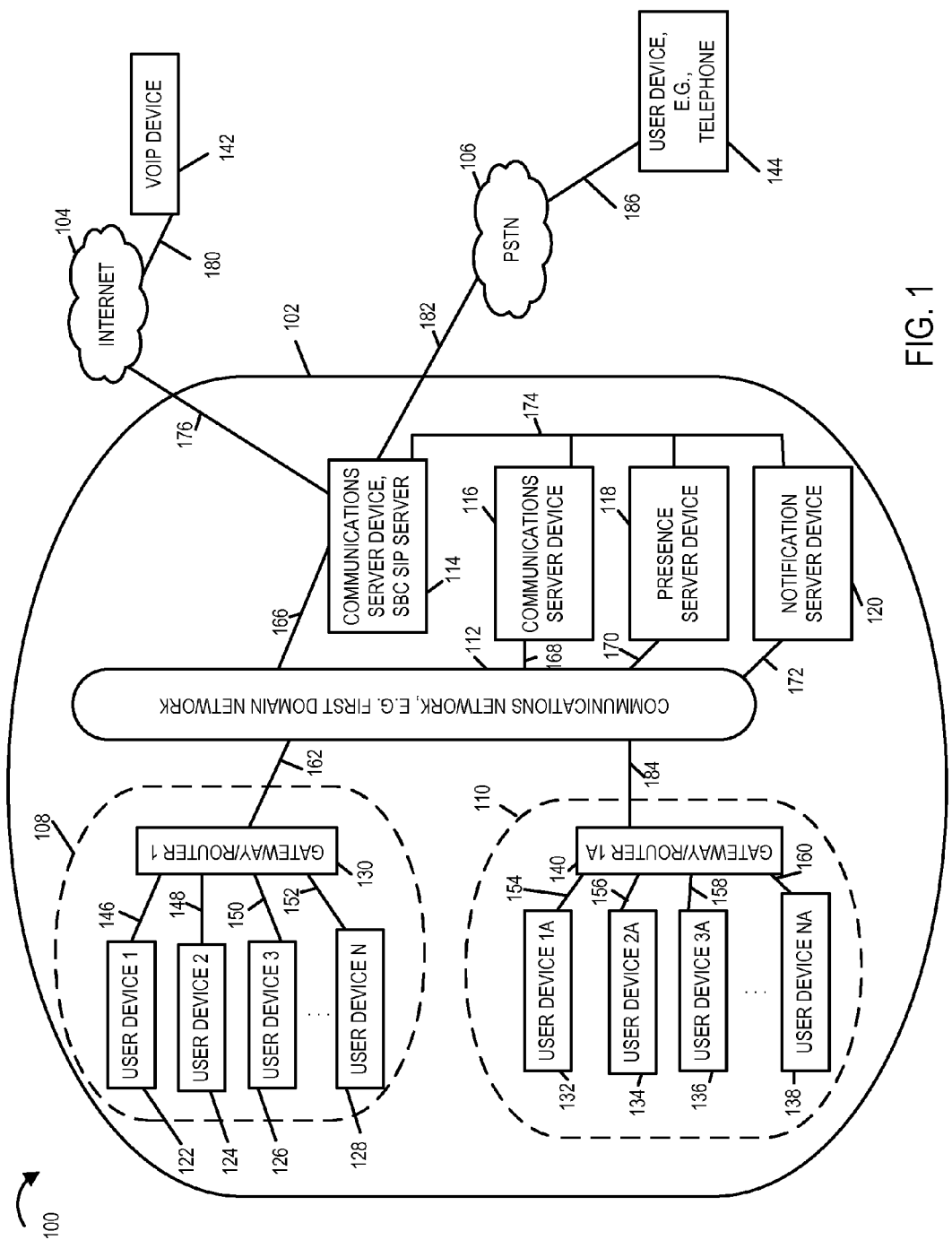
FIG. 1 illustrates an exemplary system implemented in accordance with some embodiments of the present invention.

Diagram 100 of FIG. 1 illustrates an exemplary system 102 operating in a first domain implemented in accordance with one exemplary embodiment of the invention. System 102 includes exemplary customer premises 108 and 110, exemplary communications network 112, e.g., a first domain network, exemplary communications server device 114, e.g., Session Border Controller (SBC) SIP Server, exemplary communications server 116, exemplary presence server 118, and exemplary notification server 120.

The exemplary first customer premise 108 includes an exemplary gateway and/or router 130, user device 1 122, user device 2 124, user device 3 126, . . . , user device N 128. The exemplary second customer premise 110 includes an exemplary gateway/router 1A 140, user device 1A 132, user device 2A 134, user device 3A 136, . . . , user device NA 138. Exemplary user devices include user devices such as for example mobile phones, smart phones, IP telephones, tablets, laptops, computers as well as set top boxes, internet protocol (IP) capable TVs and other IP protocol devices. User device 1 122, user device 2 124, user device 3 126, . . . , user device N 128 are coupled to gateway and/or router 130 via communications links 146, 148, 150, 152 respectively which allow for the communication of signals, messages, information, and data, e.g., audio and video call information, presence information, control instructions and messages and data between the user devices in the first customer premise 108 and the gateway/router 1 130. The gateway/router 1 130 is coupled to the communications network 112 via communications link 162. The communications network may be and in some embodiments is a first domain network which may comprise a IP network, a cable network.

Similar to the first customer premise 108, the user devices 132, 134, 136, . . . , 138 are coupled to gateway/router 1A 140 via communications links 154, 156, 158, and 160 respectively allowing for the communication of signals, messages, information, and data, e.g., audio and video call information, presence information, control instructions and messages and data between the user devices in the second customer premise 110 and the gateway/router 1A 140. Gateway/router 1A 140 is coupled to communications network 112 via communications link 184.

Communications server 114 may be, and in some embodiments is a Session Border Controller Session Initiation Protocol (SIP) Server which contains interface modules and/or circuitry for interfacing to IP networks including the Internet as well interfaces to communicate with the Public Switched Telephone Network such as via Signaling System No. 7 (SS7) protocol. In the exemplary system 102, the communications server 114 is coupled to the communications network via communications link 166 to the Internet 104 via communications link 176, to the PSTN 106 via communication link 182. Communications bus 174 couples communications server 114, communications server 116, presence server 118 and notification server 120 together and allows these servers to exchange information and data. These servers are also connected to the communications network 112 and may exchange information with each through the communications network 112 as well.

Voice Over Internet Protocol (VOIP) device 142 is coupled to the Internet 104 via communications link 180. While only one VOIP device any number of such devices may be used in connection with the present invention. User device 144, e.g., a telephone is coupled to the Public Switched Telephone Network 106 via communication link 186.

Figure 2:
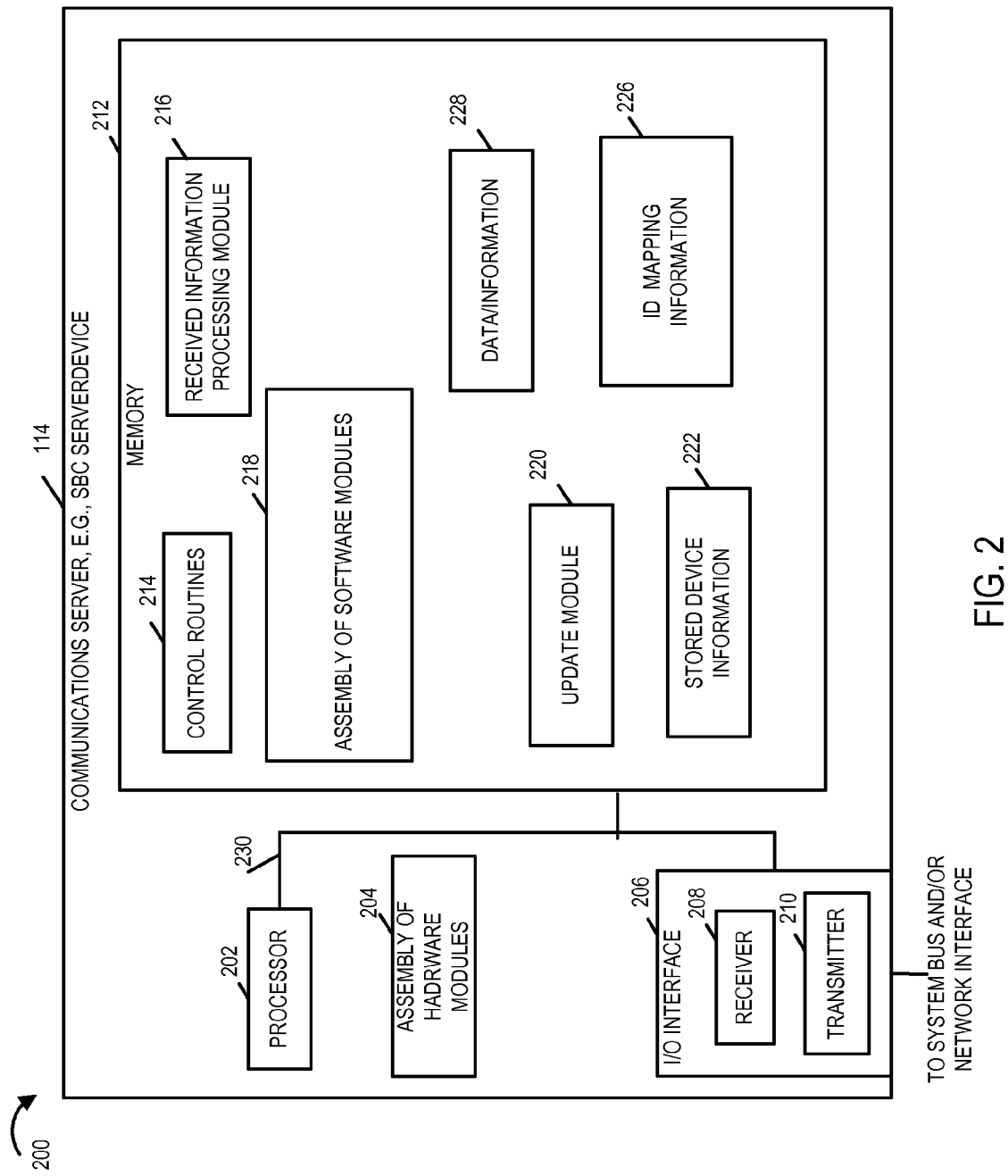
FIG. 2 illustrates an exemplary communication server in accordance with one embodiment of the present invention.

FIG. 2 illustrates some of the component details of exemplary communications server 114. As previously discussed communications server 114 may be, and in some embodiments is, a SBC SIP Server. The communications server 114 includes a processor 202 for executing instructions, an assembly of hardware modules 204 for performing various functions and steps of the present invention discussed in the flowchart of FIG. 7, a memory 212, a Input/Output (I/O) Interface 206 and a communications bus 230 which couples processor 202, assembly of hardware modules 204 memory 212 and I/O interface together and allows them to exchange information, data, message, etc. The I/O Interface 206 includes a receiver 208 and a transmitter 210 for communicating over the communication bus 174, the communications network 112, the Internet 104 and/or the PSTN 106. While only one I/O interface is shown the communications server 114 may have, and in some embodiments does have, a plurality of I/O Interfaces.

In some embodiments, the communications server 114 has one or more I/O interface for interfacing with and communicating over the Internet 104, the PSTN 106, the communication bus 174 and the communications network 112. In some embodiments one or more of the I/O Interfaces have a plurality of receivers and/or transmitters. The receiver 208 and the transmitter 210 may be implemented in hardware, software or a combination of hardware and software.

Memory 212 is used to store control routines 214, assembly of modules 218, data/information 228, ID mapping information 226, such as for example the ID mapping information of table 400 illustrated in FIG. 4, received information processing module 216, update module 220, stored device information 222.

Figure 3:
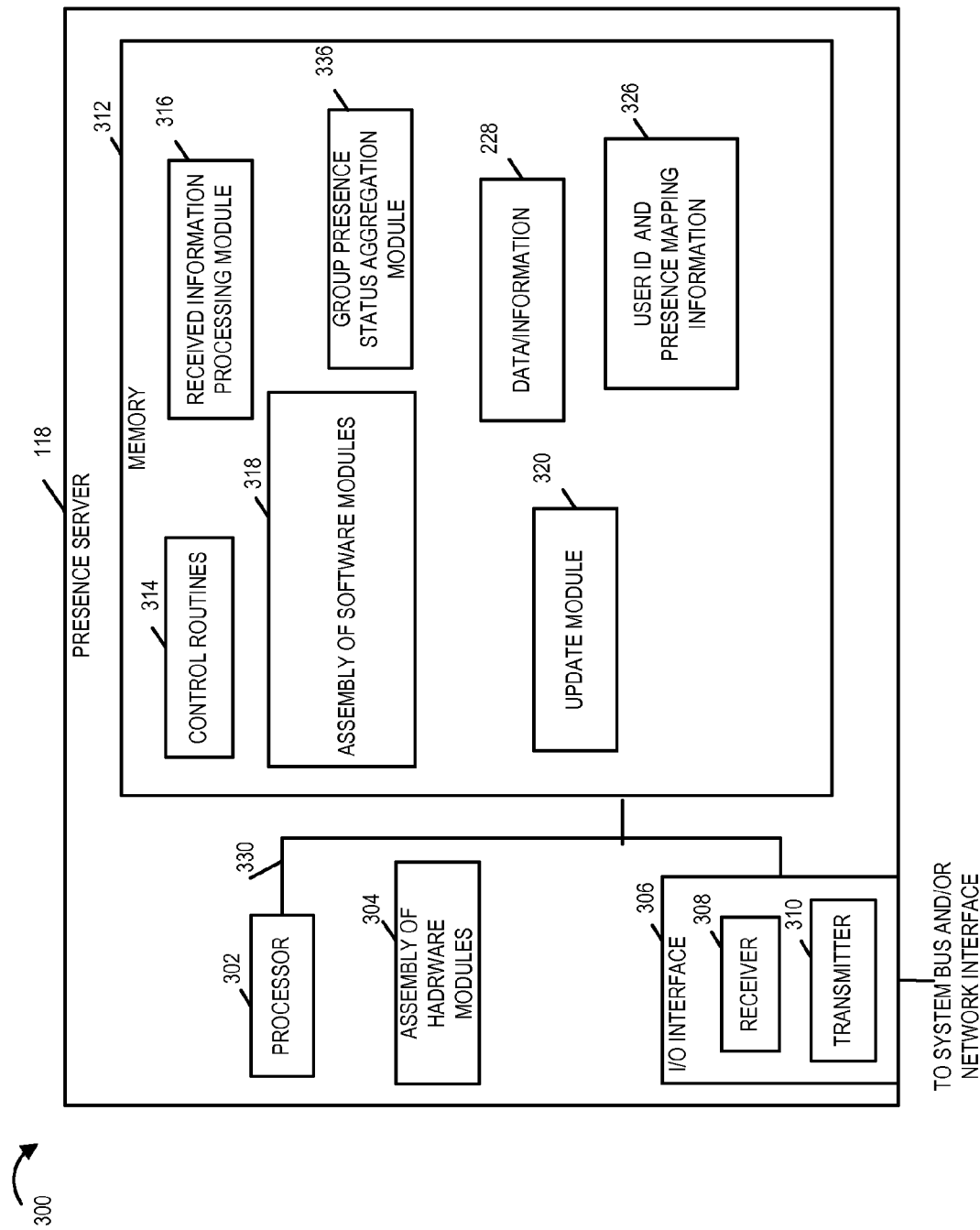
FIG. 3 illustrates an exemplary presence server in accordance with one embodiment of the present invention.

FIG. 3 illustrates some of the component details of exemplary presence server 118. In this exemplary embodiment the presence server stores the presence information for users in the 102 system such as for example users of user devices 122, 124, 126, . . . , 128, 132, 134, 136, . . . , 138 and provides presence information to devices. The presence server 118 includes a processor 302 for executing instructions, an assembly of hardware modules 304 for performing various functions and steps of the present invention discussed in the flowchart of FIG. 7, a memory 312, a Input/Output (I/O) Interface 306 and a communications bus 330 which couples processor 302, assembly of hardware modules 304 memory 312 and I/O interface 306 together and allows them to exchange information, data, message, etc. The I/O Interface 306 includes a receiver 308 and a transmitter 310 for communicating over the communication bus 174 and the communications network 112. While only one I/O interface is shown the presence server 118 may have, and in some embodiments does have, a plurality of I/O Interfaces.

In some embodiments, the presence server 118 has one or more I/O interface for interfacing with and communicating over the communication bus 174 and the communications network 112. In some embodiments one or more of the I/O Interfaces have a plurality of receivers and/or transmitters. The receiver 308 and the transmitter 310 may be implemented in hardware, software or a combination of hardware and software.

Figure 5:
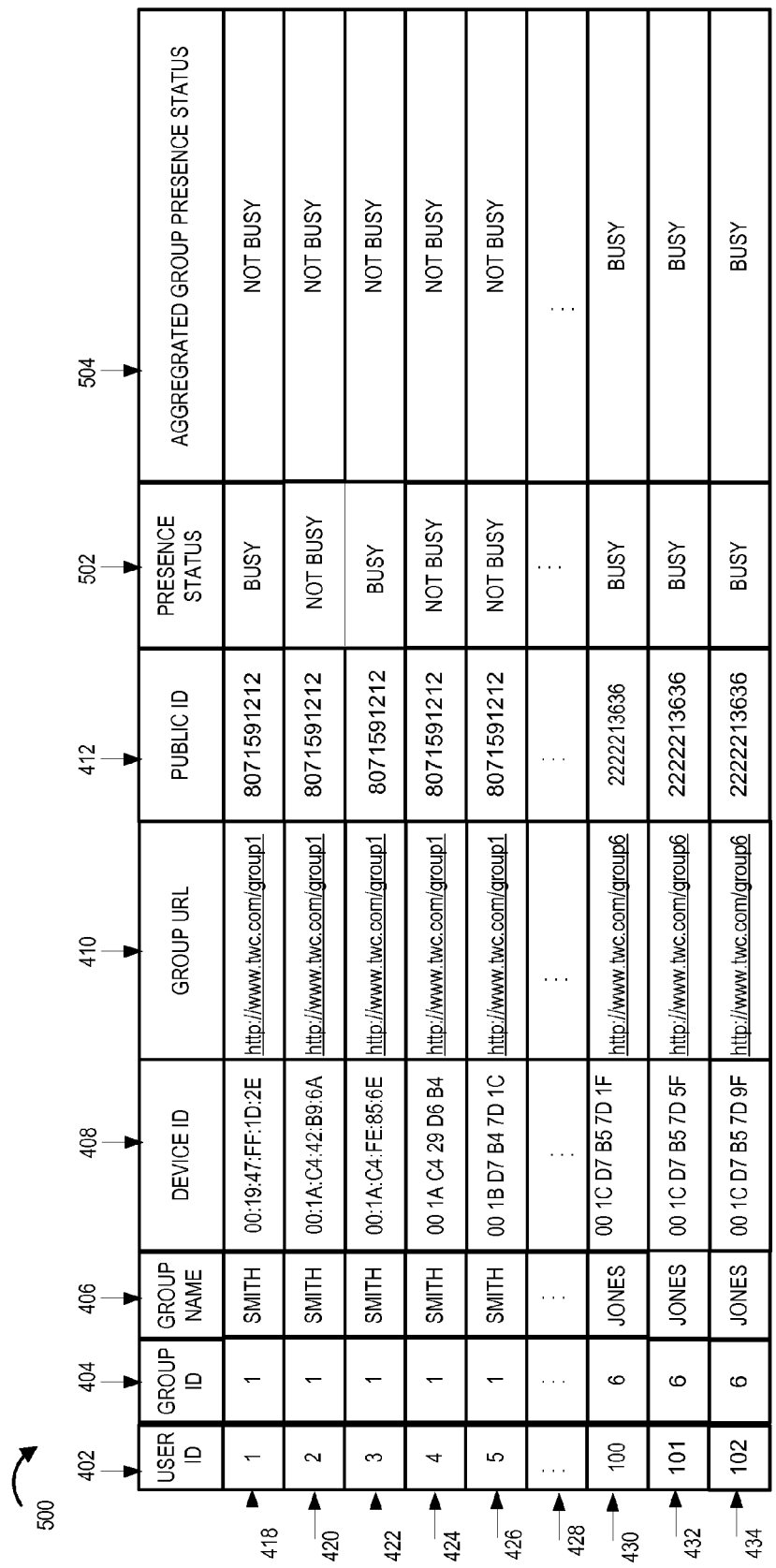
FIG. 5 illustrates a table associating various identifiers with presence status information in accordance with one embodiment of the present invention.

Memory 312 is used to store control routines 314, assembly of modules 318, data/information 328, User ID AND Presence mapping information 326, such as for example the exemplary presence information illustrated in table 500 and 600 of FIGS. 5 and 6, received information processing module 316, update module 320, group presence status aggregation module 336.

FIG. 4 illustrates table 400 which contains information associating various IDs used in the system 102 for identifying users, groups of users and devices. Table 400 is stored in memory 212 of the communications server 114 and/or the memory 312 of the presence server and/or other devices in the system. In some embodiments, the information of table 400 may be stored in a separate database that is coupled the bus 174 and accessible to the various servers and devices of the system 102 such as the communications server 114, communications server 116, presence server 118 and notification server 120.

The information contained in each of the cells of the rows 418, 420, 422, 424, 426, 428, 430, 432, and 434 associate the identifiers contained in each of the columns user ID 402 e.g., unique identifier assigned to track a registered instance of the user when registered with the system, group ID 404 (identifier of the group of which the user is a member), group name 406 (name of the group associated with the group ID and which is sometimes displayed to called parties which are outside the system 102 such as for example, VOIP device 142 and user device 144, device ID 408 (e.g., MAC address of the device), group url 410 (url used to obtain presence information associated with the group), public ID 412 (e.g., telephone number associated with the group and which is displayed to called parties outside the system 102), and Friendly ID 414 (user selected name which may in some embodiments to be displayed to other members of the group of which the user is a member), Friendly IMPU 416 (IP Multimedia Public Identity) of the respective row of the table. For example, row 418 associates user ID 1 (row 418, column 402) with group ID 1 (row 418, column 404), group name Smith (row 418, column 406), device ID 00:19:47:FF:1D:2E (row 418, column 408), group url http://ww.tw-c.com/group1 (row 418, column 410), public ID 8071591212 (row 418, column 412), Friendly ID JOHN SMITH HOME (row 418, column 414), and Fiendly IMPU sip<JOHN SMITH HOME>–8071591212@domain.com (418, column 416). Table 400 depicts two groups of users. Users associated with user IDs 1, 2, 3, 4, and 5 are members of user group ID 1 and users associated with user IDs 100, 101, and 102 are members of group ID 2. In the exemplary embodiment group 1 is made up of members of Smith family including John Smith, Ann Smith, Fred Smith and Tony Smith and which may be located at a first premises such as customer premise 108 of FIG. 1. Group 2 is made up of member of the Jones family including Bob Jones, Carol Jones and Jim Jones. The public identity provided to callees of the members of group 1 which are outside of the system 102 is the telephone number 8071591212 while the friendly ID of each user is provided to callees of the users of devices located within system 102.

FIG. 5 illustrates a table 500 depicting at a first time the presence status associated with each user ID of the system and the aggregated group presence status presented to non-members of the group. The information in table 500 may be and in some embodiments is stored in the presence server 118 and/or other servers or devices in the system. In some embodiments it may be stored in a separate database accessible to various devices/servers in the system 102. The presence information of table 500 indicates that the user associated with user ID 1 which is John Smith on his home phone is busy, user ID 2 John Smith on his mobile is not busy, user ID 3 Ann Smith is busy, user ID 4 Fred Smith is not busy and user ID 5 Tony Smith is not busy. The group 1 aggregated group presence status is not busy as there are members of the group which are not busy. The presence status of the user ID 100 Bob Jones is busy, user ID 101 Carol Jones is busy and user ID 102 Jim Jones is busy. The aggregated group presence status for group 2 is busy as all users are busy.

The aggregated group presence will be displayed to users outside system 102 who have registered to receive presence information related to the public identifiers 2222213636. The members of the group will see the individual presence status information associated with each user ID.

FIG. 6 illustrates a table 600 depicting at a second later time the presence status associated with each user ID of the system and the aggregated group presence status presented to non-members of the group. The information provided in columns 402 to 412 of tables 500 and 600 is the same the information discussed in connection in table 400. Tables 500 and 600 are extensions of table 400 including the presence information. Individual user presence information is provided in column 502 and aggregated group presence status information is provided in column 504. FIG. 6 depicts how the presence status for user ID 1 John Smith on his home phone has been updated to not busy. The group ID aggregated group presence status associated with group ID 1 remains not busy that is it is unchanged from the previous time depicted in FIG. 5. FIG. 6 also depicts how the presence status for user ID 100 Bob Jones has changed from busy to not busy. As a result of this change the group ID 6 aggregated group presence status has been updated to not busy as there is now one member user ID 100 who is not busy.

Figure 7A:
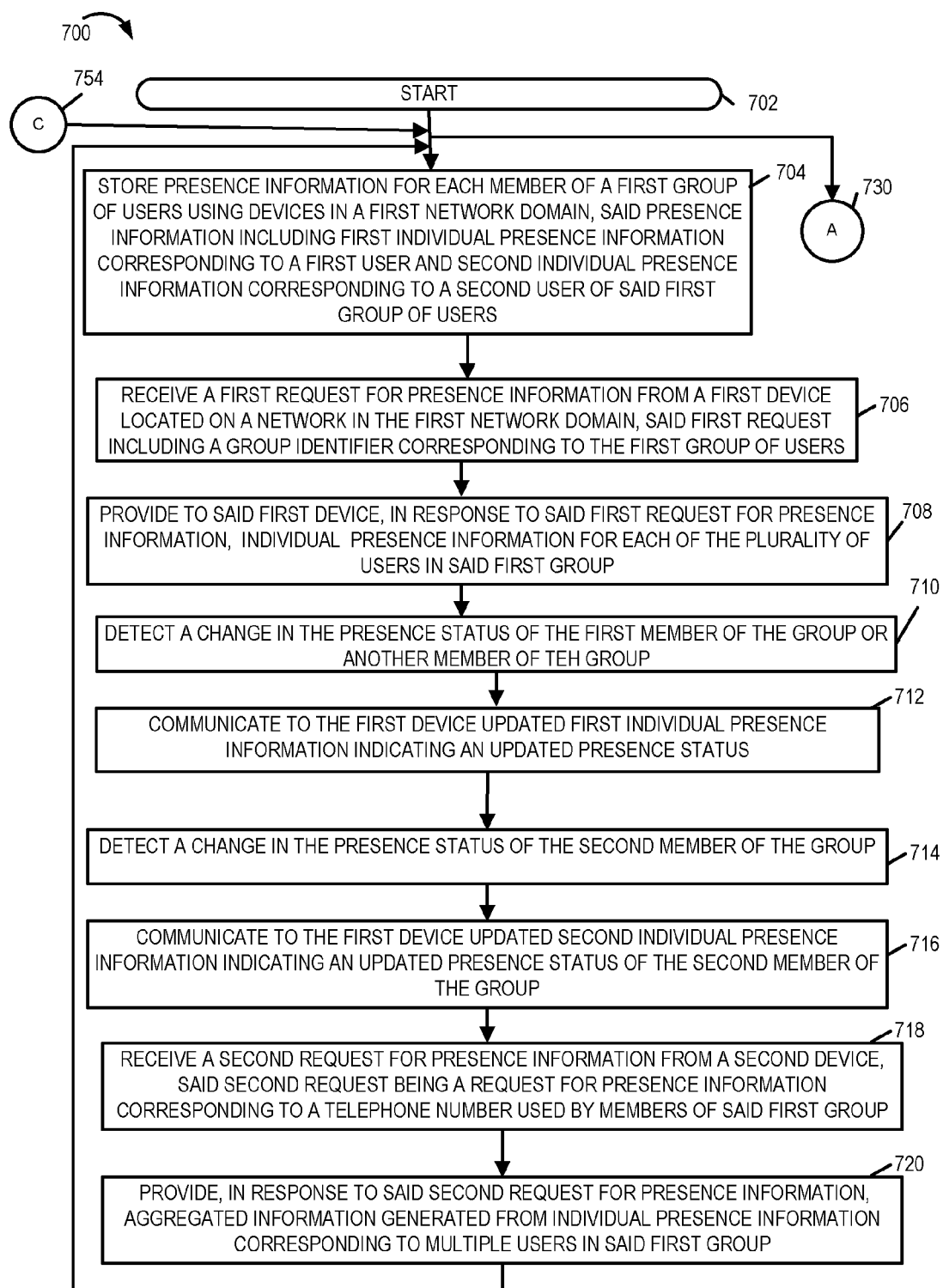
FIG. 7, which comprise the combination of FIGS. 7A, 7B, and 7C, illustrates the steps of an exemplary method which may be implemented by the system of FIG. 1 in accordance with one embodiment.
Figure 7B:
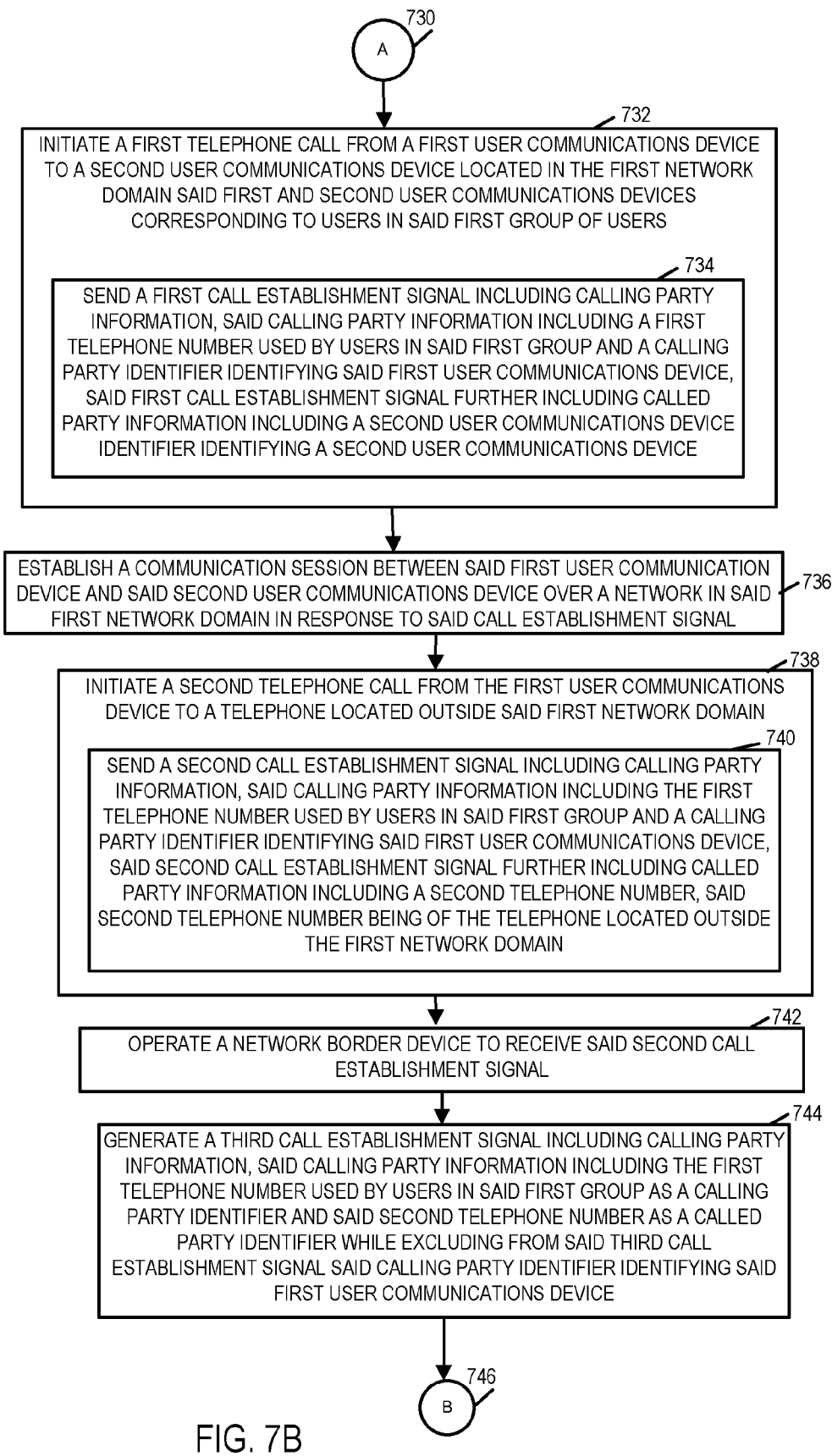
Figure 7C:
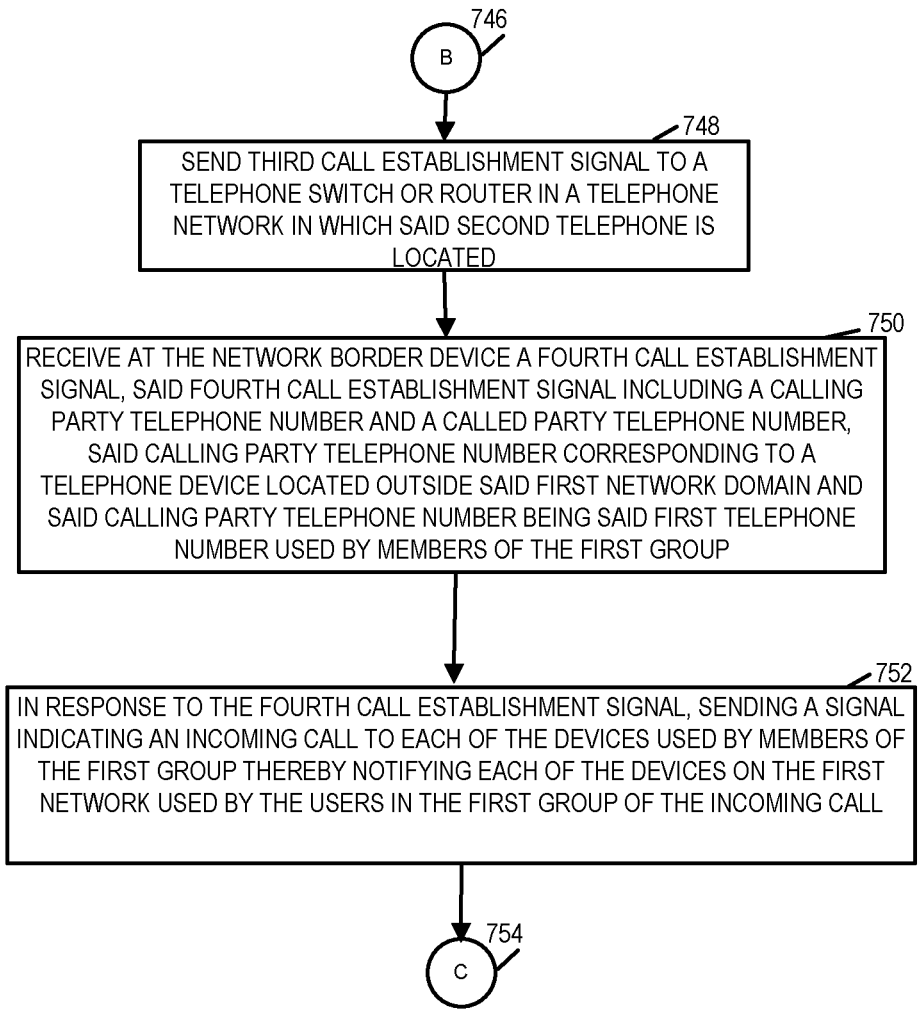

FIG. 7, which comprises the combination of FIGS. 7A, 7B and 7C, illustrates a method of providing communications services in the system of FIG. 1 in accordance with one exemplary embodiment. The method of FIG. 7 will be explained assuming the first group of users includes user devices 1 to N 122, 124, 126, 128 which correspond to, e.g., a family. The user devices are IP devices capable of supporting communications sessions, e.g., IP telephony and/or multimedia sessions via the use of SIP signaling and IP packets. The SIP (Session Initiation Protocol) signaling is used for session, e.g., call establishment. The presence server 118 stores presence information corresponding to the devices 122, 124, 126, 128 of the users of the first group. The devices in the first group are located within the first network domain 102 and are coupled to one or more telephony devices 142, 144 located outside the first network domain 102. As discussed above, devices outside the network domain can obtain aggregated status information corresponding to the first group by requesting status information corresponding to the first group, e.g., using the group telephone number, as an identifier. For purposes of calls to/from the devices in the first group to devices outside the first domain 102, a first telephone number, e.g., a common telephone number shared by the devices in the first group and thus corresponding first group of users is used. The telephone devices outside the first domain 102 may be contacted via use of telephone numbers corresponding to the devices. For example VOIP device 102 may use a one telephone number, user device 144 a different telephone number while the group telephone number would be different from the telephone numbers used by devices 142, 144. The communications sever device 114, which may be a session border controller, operates as an interface between the first network domain 102 and other networks such as the Internet 104 and PSTN 106 located outside the first network domain. The SBC performs signaling conversion to the extent necessary and prevents individual device identifier information from being included in call establishment signals sent by members of the first group being passed to devices outside the first network domain. Thus to the world outside the first network domain 102, a group will appear as a single entity even though multiple users and devices may correspond to the group.

The method 700 shown in FIG. 7 will now be discussed in detail. The method starts in step 702 with the devices in the network being powered on and becoming operations. Operation proceeds from step 702 along two paths. The first path which begins with step 704 is a presence related path which includes steps relating to presence information requests and for providing presence information. Steps 704 to 720 maybe, and in some embodiments are, provided by presence server 118 operating alone or in combination with notification server 120. In some embodiments the presence server 118 stores and maintains presence information as well as responds to requests for presence information. In other embodiments notification sever 120 is used to send notifications in response to presence information requests using the presence information stored and maintained by presence server 118.

In addition to the presence information path, the method 700 includes a path with steps relating to all processing. Calls maybe sent between devices of a group in the first network domain, can be sent by a device in a group located in the first network domain 102 to a device, e.g., 142 or 144 outside the first network domain 102. In addition telephony devices 142, 144 can call a device in the first network domain with signaling being communicated through the SBC server 114 which operates as a gateway device providing protocol and/or signaling conversions to the extent necessary. Depending on the source and destination of a call, calls and the information in the call related signaling may vary. While the term signal is used, this language is intended to cover messages such as SIP messages used for call establishment purpose and/or Signaling System 7 messages often used in the PSTN (Public Switched Telephone Network) to control call routing and/or call handling.

The presence related processing path of FIG. 7 will now be discussed further. In step 704 presence information is stored, e.g., by the presence server 118 in memory or another non-transitory storage device for each member of a first group of users using devices in a first network domain. The presence information includes first individual presence information corresponding to a first user, e.g., presence information for user device 122, and second individual presence information corresponding to a second user, e.g., for user device 124, of said first group of users 122, 124, 126, 128. Thus presence information is stored and is available on a per device basis at the presence server 118 for each of the user devices shown in FIG. 1. The per device presence information maybe, and in some embodiments is, aggregated for the devices of a group. For example, is any of the devices in the first group are active, e.g., on, the aggregated presence for the group may be indicated to be on while if all the devices of the first group are inactive, the aggregated presence information would indicate an off or inactive presence state. While the aggregated presence information may indicate active for the first group of devices/users, all devices in the first group need not be active for such an aggregated "on" status indication.

Operation proceeds from step 704 to step 706 in which a first request for presence information from a first device located on a network in the first network domain is received, e.g., by the presence server 118 or notification server 120 depending on the particular embodiment. In exemplary step 706, the first request includes a group identifier corresponding to the first group of users and being from the first device is from a member of the group which can be know from a device identifier included in the first request along with a first group identifier such as the telephone number used by the group or a URL corresponding to the first group 122, 124, 126, 128 of user devices.

In step 708, in response to the first request for presence information, the presence server 118 or notification server 120 provides, to said first device 122 which sent the received request, individual presence information for each of the plurality of users in said first group. Thus, in response to a single request in the form of a URL of the first group of user devices, the first device 122 may be supplied with individual presence information corresponding to each of the other members of the first group. In this way, a family member, e.g., in the case of a family group, can easily and quickly obtain presence information indicative of the status of other family members in the same family group.

In at least one embodiment the first request for presence information is a request to subscribe to notifications communicating updates to said presence information.

In some cases the first request for presence information includes a URL corresponding to said first group, information identifying said first device, and an address which can be used to communicate presence information to the first device.

Over time a change in the presence status of user device may occur and be reported to the presence server 118 which can detect such a change. In step 710 a change in the presence status of the first member of the group or another group member is detected and in step 712 the change in the presence information is communicated to the first device as an updated presence status information for the group member to which the updated information is indicated to correspond in the update message.

Operation proceeds from step 712 to step 714 which is included to show detection of a change in the presence status corresponding to an additional device, e.g., the second device 124 which is a member of the first group. In response to detecting the change in the status of the first member of the group, a message is sent to the first device 122 communicating updated second individual presence information thereby informing the first device as was requested via the first request for presence information of the presence status of the second device and/or changes thereto.

While the first and second devices 122, 124 are in the first domain and can request presence information corresponding to the first group, requests for presence information corresponding to the first group of users is handled differently for requests for first group presence information from outside the first domain. With respect to requests from outside the first network domain or in some but not necessarily all cases from devices who are not members of the first group, presence information is restricted to be provided on an aggregated basis with a presence state being provided for the group of users and/or user devices rather than on an individual per device or user basis.

In step 718 a second request for presence information corresponding to the first group of users is received from a device, e.g., device 142, outside the first network domain 102. The second request in step 718 is a request for presence information corresponding to a telephone number used by members of the first group and in addition to information such as an IP address or phone number identifying the requesting device includes an identifier of the first group of devices, e.g., the first group phone number or a group name or URL identifying the first group.

In response to said second request for presence information, the presence server 118 or notification server 120 provide in step 720 aggregated presence information for the first group that was generated by the presence server 118 from individual presence information corresponding to multiple users/user devices 122, 124, 126, 128 in the first group.

Operation is shown proceeding from step 720 to step 704 to show that the presence server will update presence information on an ongoing basis and changes in presence information will be reported in response to received requests.

Call initiation from devices in the first network domain and the processing of calls directed to devices in the first network domain 102 form outside the first network domain 102 will now be described with reference to the 732-752.

Operation proceeds from start step 702 via connecting node 730 to step 732 which may be performed in parallel with step 704. As should be appreciated calls may be placed between members of the first group while in the first domain. To support such calls between devices sharing a group telephone number device identification information used in the first network domain is used alone or in combination with the group telephone number as calling party identification information. In step 732 a first telephone call is initiated from the first user communications device 122 to the second user communications device 124 while the first user communications device 122 and said second user communications device 124 are located in the first network domain 102. The first and second user communications devices 122, 124 correspond to the first group of users. Initiating a telephone call includes, in sub-step 734, sending a first call establishment signal including calling party information, where the calling party information includes the first telephone number used by users in the first group and a calling party identifier identifying the first user communications device 122. The first call establishment signal further includes called party information including a second user communications device identifier identifying the second user communications device 124 to which the call is placed. The user device 122 sends the call initiation signal, e.g., a SIP signal, to the communications server 116 or SIP server 114 depending on which device is responsible for controlling calls within the first network domain. In one embodiment the communications server 116 handles intra domain calls while the SBC 114 handles inter domain calls. However, in at least some embodiments the servers 114, 116 and/or there functionally are implemented in a single device.

In step 736 the server 116 or 114 establishes a communications session between the first user communication device 122 and the second user communications device 124 over a network 112 in said first network domain 102 in response to the call establishment signal.

Thus it should be appreciated that calls may be placed between devices in a group with device identifiers facilitating identification of the devices which are to serve as the end points of a call within the network domain 102.

Calls may be made from a device in the first network domain to devices outside the first network domain. In the case of such inter domain calls, the call signaling will pass through the session border control 114 which may, and sometimes does, support SIP signaling and/or protocol conversions as may be necessary to communicate between domains/networks using different signaling protocols. The border session controller 114 will strip off device identifier information and leave the group telephone number as the calling party identifier when a call from a device in the first group leaves the first network domain.

In step 738 the first device 122 initiates a second telephone call to a telephone 144 located outside said first network domain 102. Initiating the second telephone call includes, in substep 740, sending a second call establishment signal including, as calling party identification information, a telephone number used by users in said first group and a calling party identifier identifying said first user communications device. The second call establishment signal also includes as called party information a second telephone number where the second telephone number corresponds to telephone 144 located outside the first network domain. The session border controller 114 receives the second call establishment signal in step 742 and stores a session identifier in memory along with the calling party information and calling party device identifier and then proceeds to generate in step 744 a third call establishment signal to be sent to the PSTN 106 to complete the call to the telephone 144. In step 744 the SBC 114 generates a third call establishment signal including calling party information including the telephone number used by users in said first group as a calling party identifier and said second telephone number as a called party identifier while excluding from the third call establishment signal the calling party identifier identifying the first user communications device. In step 748 the SBC sends the third call establishment signal to a telephone switch or router in a telephone network in which said second telephone is located. Thus, the PSTN sees the incoming call as a call from the first telephone number shared by members of the first group that is directed to the telephone number of the telephone 144. The PSTN does not and need not have information identifying which particular device in the first group initiated the telephone call. Operation proceeds from step 744 to step 748 via connecting node 746. As should be appreciated in the described manner a call may be established between a device 122 in a group in the first network domain with a device 144 coupled to the PSTN 106 or VOIP device 142.

In addition to initiating calls, devices 122, 124, 126, 128 in the first group may receive calls from within the first network domain or from outside the first network domain 102. In the case of calls from outside the first network domain 102, the calling telephone will use the group telephone number as the called party number. Thus, when the SBC 114 receives an incoming call from outside the first network domain 102 it will normally lack the device identification information to identify a specific device, to which the call should be routed, in a group of devices which share the called party telephone number.

In step 750 the network session border controller device 114 receives a fourth call establishment signal. The fourth call establishment signal includes a calling party telephone number, e.g., corresponding to telephony device 142 or 144, and a called party telephone number where the called party telephone number is the first telephone number used by members of the first group.

In response to the forth call establishment signal, the SBC 114 sends a signal indicating an incoming call to each of the devices 122, 124, 126, 128 in the first group to thereby notify each of the devices in the first group of the call to the shared telephone number used by the group.

When a user answers one of the devices in the first group, a communications session is established with the answering device and the call signaling to the other devices in the first group is stopped. In this manner, the first answering device may be considered the winner of the incoming call directed to the shared telephone number used by the devices of the first group.

Calls which are generated may be terminated in the usual manner, e.g., when a party hangs up or a connection with a device is lost for some reason.

Operation is shown proceeding from step 752 to steps 704/732 to indicate that presence related operations and call processing will continue to be performed on an ongoing basis as new calls are initiated and/or terminated.

Numerous variations on the above described embodiments are possible.

While a logical sequencing of the processing steps of the exemplary embodiments of the methods, routines and sub-routines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a media content distribution system. Various embodiments are also directed to methods, e.g., a method of controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method. In some embodiments devices, elements and/or modules that are configured to perform various functions are implemented as circuits, e.g., with a different circuit for each function being implemented in some but not necessarily all embodiments.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of providing presence information, the method comprising:

storing presence information for each member of a first group of users using devices in a first network domain, said presence information including first individual presence information corresponding to a first user and second individual presence information corresponding to a second user of said first group of users;

receiving a first request for presence information from a first device located on a network in the first network domain, said first request including a group identifier corresponding to the first group of users;

in response to said first request for presence information, providing to said first device, individual presence information for each of the plurality of users in said first group;

initiating a first telephone call from a first user communications device to a second user communications device while said first user communications device and said second user communications device are located in said first network domain, said first and second user communications devices corresponding to users in said first group of users, said initiating a first telephone call including sending a first call establishment signal including calling party information, said calling party information including a first telephone number used by users in said first group and a calling party identifier identifying said first user communications device, said first call establishment signal including called party information including a second user communications device identifier identifying said second user communications device;

establishing a communications session between said first user communication device and said second user communications device over a network in said first network domain in response to said first call establishment signal;

initiating a second telephone call from the first user communications device to a telephone located outside said first network domain, said initiating the second telephone call including sending a second call establishment signal including a telephone number used by users in said first group, a calling party identifier identifying said first user communications device, and called party information including a second telephone number, said second telephone number being a telephone number of the telephone located outside said first network domain;

operating a network border device to receive said second call establishment signal;

generating a third call establishment signal including calling party information including the telephone number used by users in said first group as a calling party identifier and said second telephone number as a called party identifier while excluding from said third call establishment signal said calling party identifier identifying said first user communications device; and sending said third call establishment signal to a telephone switch or router in a telephone network in which said second telephone is located.

2. The method of claim 1, wherein said request is a request to subscribe to notifications communicating updates to said presence information.

3. The method of claim 2, wherein said request includes a URL corresponding to said first group, information identifying said first device, and an address which can be used to communicate presence information to the first device.

4. The method of claim 2, further comprising:
detecting a change in the presence status of the first member of the group; and
communicating to the first device updated first individual presence information indicating an updated presence status of the first member of the group.

5. The method of claim 4, further comprising:
detecting a change in the presence status of the second member of the group; and
communicating to the first device updated second individual presence information indicating an updated presence status of the second member of the group.

6. The method of claim 4, further comprising:
receiving a second request for presence information from a device outside said first network domain, said second request being a request for presence information corresponding to a telephone number used by members of said first group; and
in response to said second request for presence information providing aggregated presence information generated from individual presence information corresponding to multiple users in said first group.

7. The method of claim 1, further comprising:
receiving at the network border device a fourth call establishment signal, said fourth call establishment signal including a calling party telephone number and a called party telephone number, said calling party telephone number corresponding to another telephone device located outside said first network domain and said called party telephone number being said first telephone number used by members of the first group; and
in response to the forth call establishment signal, sending a signal indicating an incoming call to each of the devices used by members of the first group thereby notifying each of the devices on the first network used by the users in the first group.

8. A system comprising:
a presence server including:
memory including stored presence information for each member of a first group of users using devices in a first network domain, said presence information including first individual presence information corresponding to a first user and second individual presence information corresponding to a second user of said first group of users;
a communications interface for receiving a first request for presence information from a first device located on a network in the first network domain, said first request including a group identifier corresponding to the first group of users;
a processor configured to respond to said first request for presence information, by providing to said first device, individual presence information for each of the plurality of users in said first group;

a first user communications device configured to:
(i) initiate a first telephone call from the first user communications device to a second user communications device while said first user communications device and said second user communications device are located in said first network domain, said first and second user communications devices corresponding to users in said first group of users, said initiating a first telephone call including sending a first call establishment signal including calling party information, said calling party information including a first telephone number used by users in said first group and a calling party identifier identifying said first user communications device, said first call establishment signal including called party information including a second user communications device identifier identifying said second user communications device,
(ii) establish a communications session between said first user communication device and said second user communications device over a network in said first network domain in response to said first call establishment signal, and
(iii) initiate a second telephone call from the first user communications device to a telephone located outside said first network domain, said initiating the second telephone call including sending a second call establishment signal including a telephone number used by users in said first group, a calling party identifier identifying said first user communications device, and called party information including a second telephone number, said second telephone number being a telephone number of the telephone located outside said first network domain; and a network border device configured to:
(i) receive said second call establishment signal,
(ii) generate a third call establishment signal including calling party information including the telephone number used by users in said first group as a calling party identifier and said second telephone number as a called party identifier while excluding from said third call establishment signal said calling party identifier identifying said first user communications device, and
(iii) sending said third call establishment signal to a telephone switch or router in a telephone network in which said second telephone is located.

9. The system of claim 8, wherein said request is a request to subscribe to notifications communicating updates to said presence information.

10. The system of claim 9, wherein said request includes a URL corresponding to said first group, information identifying said first device, and an address which can be used to communicate presence information to the first device.

11. A non-transitory computer readable medium including;
- computer executable instructions which when executed by a processor in a presence server, control the presence server to:
  - store presence information for each member of a first group of users using devices in a first network domain, said presence information including first individual presence information corresponding to a first user and second individual presence information corresponding to a second user of said first group of users;
  - receive a first request for presence information from a first device located on a network in the first network domain, said first request including a group identifier corresponding to the first group of users; and
  - provide to said first device, in response to said first request for presence information, individual presence information for each of the plurality of users in said first group;
- computer executable instructions which when executed by a processor in a first user communications device, control the first user communications device to:
  - (i) initiate a first telephone call from the first user communications device to a second user communications device while said first user communications device and said second user communications device are located in said first network domain, said first and second user communications devices corresponding to users in said first group of users, said initiating a first telephone call including sending a first call establishment signal including calling party information, said calling party information including a first telephone number used by users in said first group and a calling party identifier identifying said first user communications device, said first call establishment signal including called party information including a second user communications device identifier identifying said second user communications device,
  - (ii) establish a communications session between said first user communication device and said second user communications device over a network in said first network domain in response to said first call establishment signal, and
  - (iii) initiate a second telephone call from the first user communications device to a telephone located outside said first network domain, said initiating the second telephone call including sending a second call establishment signal including a telephone number used by users in said first group, a calling party identifier identifying said first user communications device, and called party information including a second telephone number, said second telephone number being a telephone number of the telephone located outside said first network domain; and
- computer executable instructions which when executed by a processor in a network border controller, control the network border controller to:
  - (i) receive said second call establishment signal,
  - (ii) generate a third call establishment signal including calling party information including the telephone number used by users in said first group as a calling party identifier and said second telephone number as a called party identifier while excluding from said third call establishment signal said calling party identifier identifying said first user communications device, and
  - (iii) sending said third call establishment signal to a telephone switch or router in a telephone network in which said second telephone is located.

* * * * *